United States Patent
Silverman et al.

(10) Patent No.: US 12,267,101 B2
(45) Date of Patent: Apr. 1, 2025

(54) ACCESS POINT (AP) RANGING AND PLACEMENT ON A FLOORPLAN

(71) Applicant: Cisco Technology, Inc., San Jose, CA (US)

(72) Inventors: Matthew Aaron Silverman, Shaker Heights, OH (US); Robert E. Barton, Richmond (CA); Brian D. Hart, Sunnyvale, CA (US); Jerome Henry, Pittsboro, NC (US); Ardalan Alizadeh, Milpitas, CA (US); Vishal S. Desai, San Jose, CA (US); John Matthew Swartz, Lithia, FL (US)

(73) Assignee: Cisco Technology, Inc.

( * ) Notice: Subject to any disclaimer, the term of this patent is extended or adjusted under 35 U.S.C. 154(b) by 74 days.

(21) Appl. No.: 18/301,511

(22) Filed: Apr. 17, 2023

(65) Prior Publication Data

US 2024/0348284 A1     Oct. 17, 2024

(51) Int. Cl.
*H04B 1/7183* (2011.01)
*H04W 84/12* (2009.01)

(52) U.S. Cl.
CPC ........... *H04B 1/7183* (2013.01); *H04W 84/12* (2013.01)

(58) Field of Classification Search
CPC .............................. H04B 1/7183; H04W 84/12
See application file for complete search history.

(56) References Cited

U.S. PATENT DOCUMENTS

| | | | |
|---|---|---|---|
| 2007/0147317 A1* | 6/2007 | Smith | H04W 48/18 370/338 |
| 2015/0094081 A1 | 4/2015 | Gupta | |
| 2015/0131529 A1* | 5/2015 | Zhou | H04W 40/32 370/328 |
| 2015/0172957 A1* | 6/2015 | Sarawat | H04W 28/0942 370/235 |
| 2017/0171833 A1 | 6/2017 | Vamaraju et al. | |
| 2020/0008169 A1* | 1/2020 | Henry | H04W 36/00835 |
| 2020/0015041 A1 | 1/2020 | Cariou et al. | |
| 2020/0153578 A1* | 5/2020 | Lerosey | H01Q 3/44 |
| 2021/0204243 A1 | 7/2021 | Choi et al. | |

(Continued)

FOREIGN PATENT DOCUMENTS

EP     4149143 A1     3/2023

OTHER PUBLICATIONS

International Search Report and Written Opinion for International Application No. PCT/US2024/025054, mailed Sep. 25, 2024, 18 Pages.

(Continued)

*Primary Examiner* — Janice N Tieu
(74) *Attorney, Agent, or Firm* — Merchant & Gould P.C.

(57) ABSTRACT

Access Point ranging and placement on a floorplan may be provided. A host AP may range each neighbor AP of the host AP. One or more neighbor APs that failed ranging with the host AP may be categorized in a failed neighbor AP list. The host AP may re-range each of the one or more neighbor APs in the failed neighbor AP list with a modified ranging parameter. At least one neighbor AP of the one or more neighbor APs may be categorized in the failed neighbor AP list that succeeded in re-ranging with the host AP in an extended range neighbor AP list.

13 Claims, 6 Drawing Sheets

(56) References Cited

U.S. PATENT DOCUMENTS

2021/0227489 A1     7/2021   Henry et al.
2022/0377699 A1    11/2022   Silverman et al.

OTHER PUBLICATIONS

Huilla, Sami, "Smartphone-Based Indoor Positioning Using Wi-Fi Fine Timing Measurement Protocol", Master of Science Thesis, University of Turku, Department of Future Technologies, Sep. 2019 (82 pages).

* cited by examiner

ACCESS POINT (AP) RANGING AND PLACEMENT ON A FLOORPLAN

TECHNICAL FIELD

The present disclosure relates generally to network equipment and location services.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

In some instances, it is useful to determine APs location within a mobile networking environment. While the Institute of Electrical and Electronics Engineers (IEEE) 802.11 (e.g., Wi-Fi or Bluetooth ranging techniques may be utilized in some cases to determine mobile device location, such technologies may provide limited location accuracy. Ultra-Wideband (UWB), as defined in IEEE 802.15.4a and 802.15.4z, may offer improved ranging accuracy over Wi-Fi and Bluetooth.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
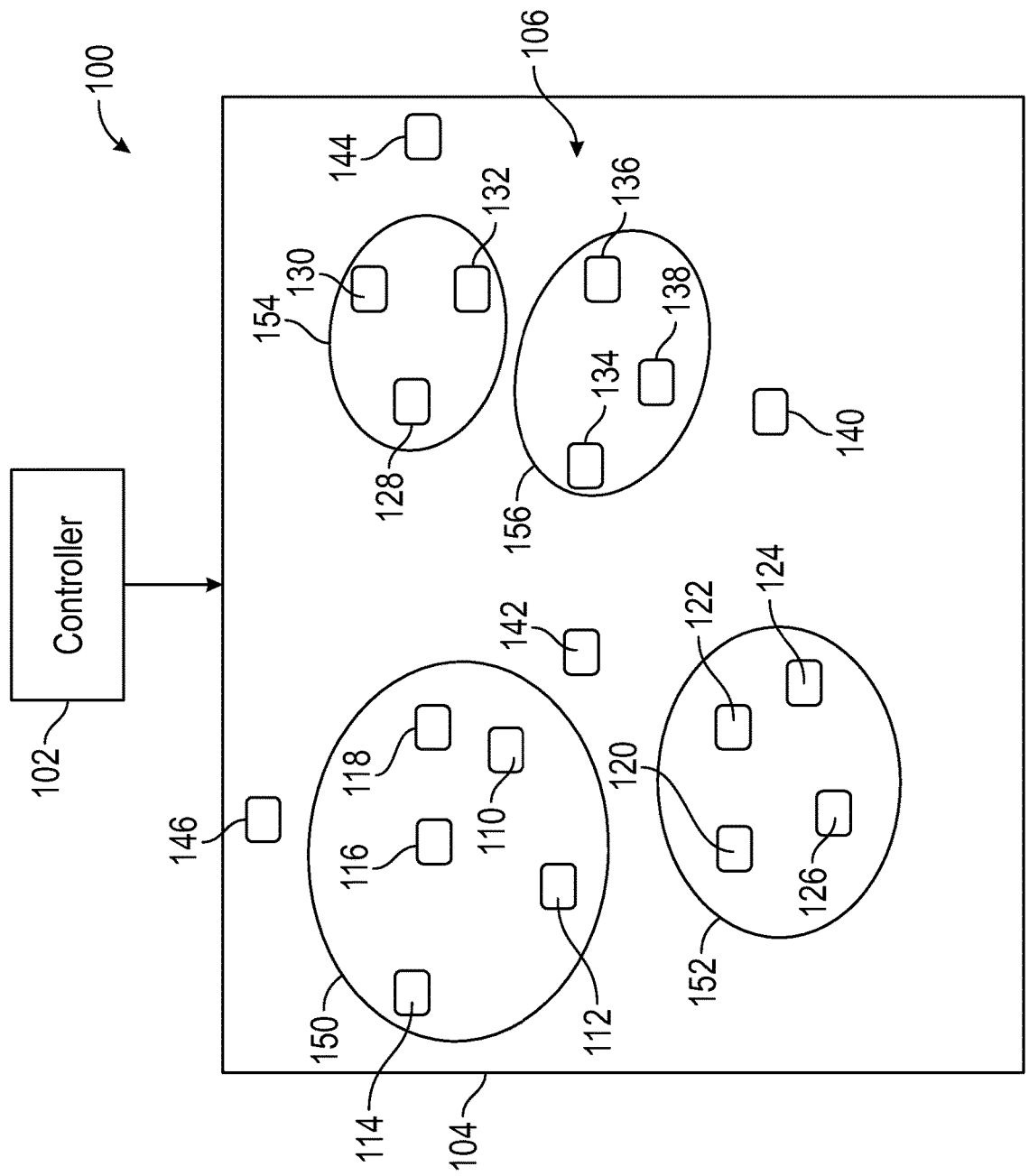
FIG. 1 is a block diagram of an operating environment for providing a differentiated time-difference of arrival for ultra-wideband.

Access Point ranging and placement on a floorplan may be provided. A host AP may range each neighbor AP of the host AP. One or more neighbor APs that failed to range with the host AP may be categorized in a failed neighbor AP list. The host AP may re-range each of the one or more neighbor APs in the failed neighbor AP list with a modified ranging parameter. At least one neighbor AP of the one or more neighbor APs may be categorized in the failed neighbor AP list that succeeded in re-ranging with the host AP in an extended range neighbor AP list.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Fine Ranging (FiRa) may provide a specification for indoor location based on Ultra-Wide Band (UWB). UWB may have a more accurate ranging due to wider bandwidth. However, UWB may suffer from limited range compared to other ranging techniques. In addition, UWB may fail when used for ranging between large set of Access Points (APS). The disclosure may provide processes to extend range of UWB and auto-positioning of APS in a floorplan using UWB.

FIG. 1 shows an operating environment 100 for providing AP ranging and placement on a floorplan. As shown in FIG. 1, operating environment 100 may comprise a controller 102 and a floorplan 104. Floorplan 104 may comprise, but is not limited to, a Wireless Local Area Network (WLAN) comprising a plurality of APs 106 that may provide wireless network access (e.g., access to the WLAN) to a plurality of client devices. Plurality of APs 106 may comprise a first AP 110, a second AP 112, a third AP 114, a fourth AP 116, a fifth AP 118, a sixth AP 120, a seventh AP 122, an eighth AP 124, a ninth AP 126, a tenth AP 128, an eleventh AP 130, a twelfth AP 132, a thirteenth AP 134, a fourteenth AP 136, a fifteenth AP 138, a sixteenth AP 140, a seventeenth AP 142, an eighteenth AP 144, and a nineteenth AP 146. Each of plurality of APs 106 may support UWB ranging. In addition each of plurality of APs may support Fine Time Measurement (FTM) ranging and WiFi ranging.

Plurality of APs 106 may form a plurality of clusters with one or more APs as a member in each cluster. For example, first AP 110, second AP 112, third AP 114, fourth AP 116, and fifth AP 118 may form a first cluster 150. Similarly, sixth AP 120, seventh AP 122, eighth AP 124, and ninth AP 126 may form a second cluster 152. In addition, tenth AP 128, eleventh AP 130, and twelfth AP 132 may form a third cluster 154. Finally, thirteenth AP 134, fourteenth AP 136, fifteenth AP 138 may form a fourth cluster 156.

Controller 102 may manage operations of plurality of APs 106. Floorplan 104 may support any density of the plurality of user devices, and may include any indoor or outdoor area, such as a home, school, campus, office building, conference center, stadium, or other venue or location or portion thereof. Each of plurality of APs 106 may be positioned at different locations in floorplan 104 and may facilitate a connection between one or more of plurality of user devices and the WLAN. Plurality of APs 106 may communicate with each other and the plurality of user devices through one or more of WLAN, Bluetooth Low Energy (BLE), and UWB. For example, plurality of APs 106 may include a Wi-Fi chipset for providing Wi-Fi connectivity, a BLE chipset for providing BLE connectivity, and a UWB chipset for providing UWB connectivity.

The plurality of user devices may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device.

The elements described above of operating environment 100 (e.g., controller 102, first AP 110, second AP 112, third AP 114, fourth AP 116, fifth AP 118, sixth AP 120, seventh AP 122, eighth AP 124, ninth AP 126, tenth AP 128, eleventh AP 130, twelfth AP 132, thirteenth AP 134, fourteenth AP 136, fifteenth AP 138, sixteenth AP 140, seventeenth AP 142, eighteenth AP 144, and nineteenth AP 146) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Figure 2:
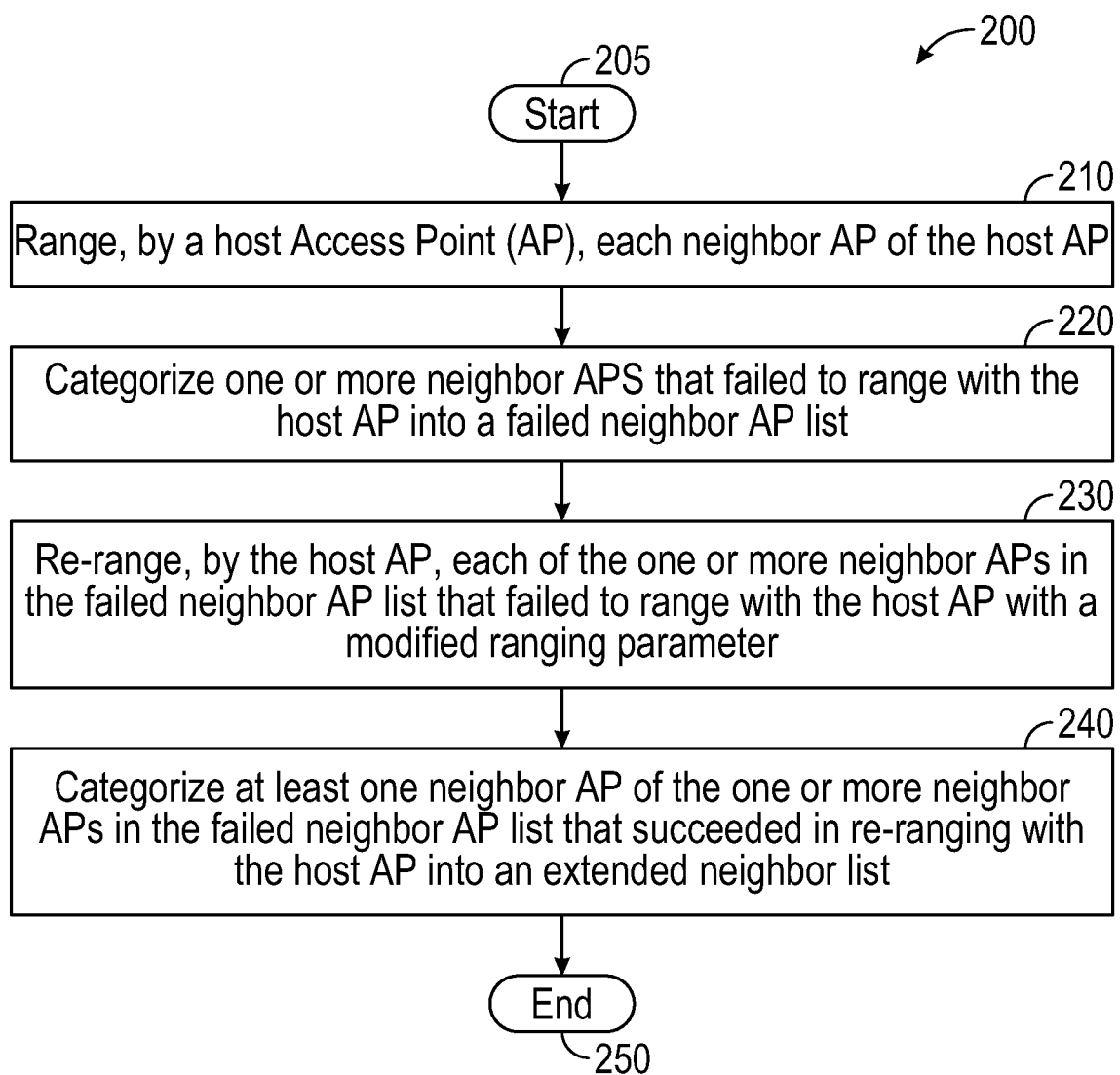
FIG. 2 is a flow chart of a method for determining a range between two Access Point (APs)

FIG. 2 is a flow chart setting forth the general stages involved in a method 200 consistent with an embodiment of the disclosure for determining a range between two APs. Method 200 may be implemented by any of plurality of APs 106 or controller 102 as described in more detail above with respect to FIG. 1. Ways to implement the stages of method 200 will be described in greater detail below.

Method 200 may begin at starting block 205 and proceed to stage 210 where a host AP (e.g., first AP 110) may range each neighbor AP of the host AP. The host AP may receive or compile a neighbor AP list. Whether an AP is a neighbor AP relative to another AP may be based on a relative signal strength of signals communicated between two APs. For example, if the signal strength is greater than or equal to a threshold signal strength, then two APs may be determined to be neighbor APs relative to one another. In contrast, if the signal strength is below the threshold signal strength, it may be determined that the two APs are not neighbor APs relative to one another. The neighbor APs list for the host AP may be provided by controller 102 or may be compiled by the host AP.

The host AP (i.e., first AP 110) may range each neighbor AP on the neighbor AP list using UWB on a UWB radio. For ranging, the host AP may send a control message in a SPO frame to the neighbor AP. The host AP may also send a ranging initiation message in a SP3 frame. In response, the neighbor AP may send a ranging response message in a SP3 frame. Next, the host AP may send a ranging final message in a SP3 frame. The host AP may also send a ranging measurement report message to the neighbor AP in a SPO frame. The neighbor AP then may compute a Time of Flight (ToF) and an Angle of Arrival (AoA). Next, the neighbor AP may send the ranging result report message in a SPO frame. The ranging result report message may include the ToF and the AoA. The host AP may range or determine a distance between the host AP and the neighbor AP based on the ToF and the AoA. The determined distance may be accurate up to 3 centimeters.

From stage 210, where the host AP ranges with each of its neighbors, method 200 may advance to stage 220 where one or more neighbor APs that failed to range with the host AP may be categorized into a failed neighbor AP list. UWB operates at a low power (i.e., −41.3 dBm in the Federal Communication Control (FCC) domain) and therefore may have a limited range. Hence, some neighbor APs may not receive the control message or the ranging initiation message from the host AP because of an obstruction in between or because their distance from the host AP is beyond the range of UWB. In some scenarios, the host AP may not receive the ToF or the AoA or may receive unreliable ToF and AoA some neighbor APs. Such instances may result in the host AP failing to range with the one or more neighbor APs. The one or more neighbor APs that failed to range with the host AP may be categorized into the failed neighbor AP list.

Once one or more neighbor APs that failed to range with the host AP are categorized into the failed neighbor AP list in stage 220, method 200 may continue to stage 230 where the host AP may re-range each of the one or more neighbor APs in the failed neighbor AP list that failed to range with the host AP with a modified ranging parameter. Modifying a ranging parameter may extend the range of UWB. In accordance with example embodiments, there may be tradeoff between a duration of UWB frames (i.e., a duty cycle) and a transmission power the UWB frames can be sent. For example, at a lower duty cycle (i.e., at a shorter length), the UWB frames may be sent at a higher transmission power as long as an average Power Spectral Density (PSD) does not exceed −41.3 dBm/MHz over 1 ms.

The duty cycle may be lowered by modifying one or more of the following physical (PHY) parameters of the UWB frames: a Synchronization Sequence (SYNC), Start Frame Delimiter (SFD), and Scrambled Timestamp Sequence (STS). SYNC may impact sensitivity and longer the better. SFD may have a limited impact on the sensitivity and the range. STS may be short, long, or none. STS may impact collisions and security of the UWB frames. Therefore, shortened or removed STS and shortened SYNC may be used to improve the range of UWB. The length of STS and SYNC may be determined by an administrator based on a tolerance level for security and collision. To mitigate or avoid collisions because of the modified ranging parameter, controller 102 may create a schedule for re-ranging. The host AP may receive the schedule and re-range each of the one or more neighbor APs in the failed neighbor AP list that failed to range with the host AP with the modified ranging parameter in its scheduled time slot.

After the host AP re-ranges each of the one or more neighbor APs in the failed neighbor AP list that failed to range with the host AP with the modified ranging parameter in stage 230, method 200 may continue to stage 240 where at least one neighbor AP of the one or more neighbor APs in the failed neighbor AP list that succeeded in re-ranging with the host AP may categorized into an extended neighbor AP list. The extended neighbor AP list may be provided with an indication that the range may have been determined using relaxed ranging parameters. Once the at least one neighbor AP of the one or more neighbor APs in the failed neighbor AP list that succeeded in re-ranging with the host AP is categorized into the extended neighbor AP list in stage 240, method 200 may then end at stage 250. Method 200 may be utilized to determine ranges between two or more APs of plurality of APs 106. The determined ranges may then be used for placement of plurality of APs 106 on floorplan 104.

Figure 3:
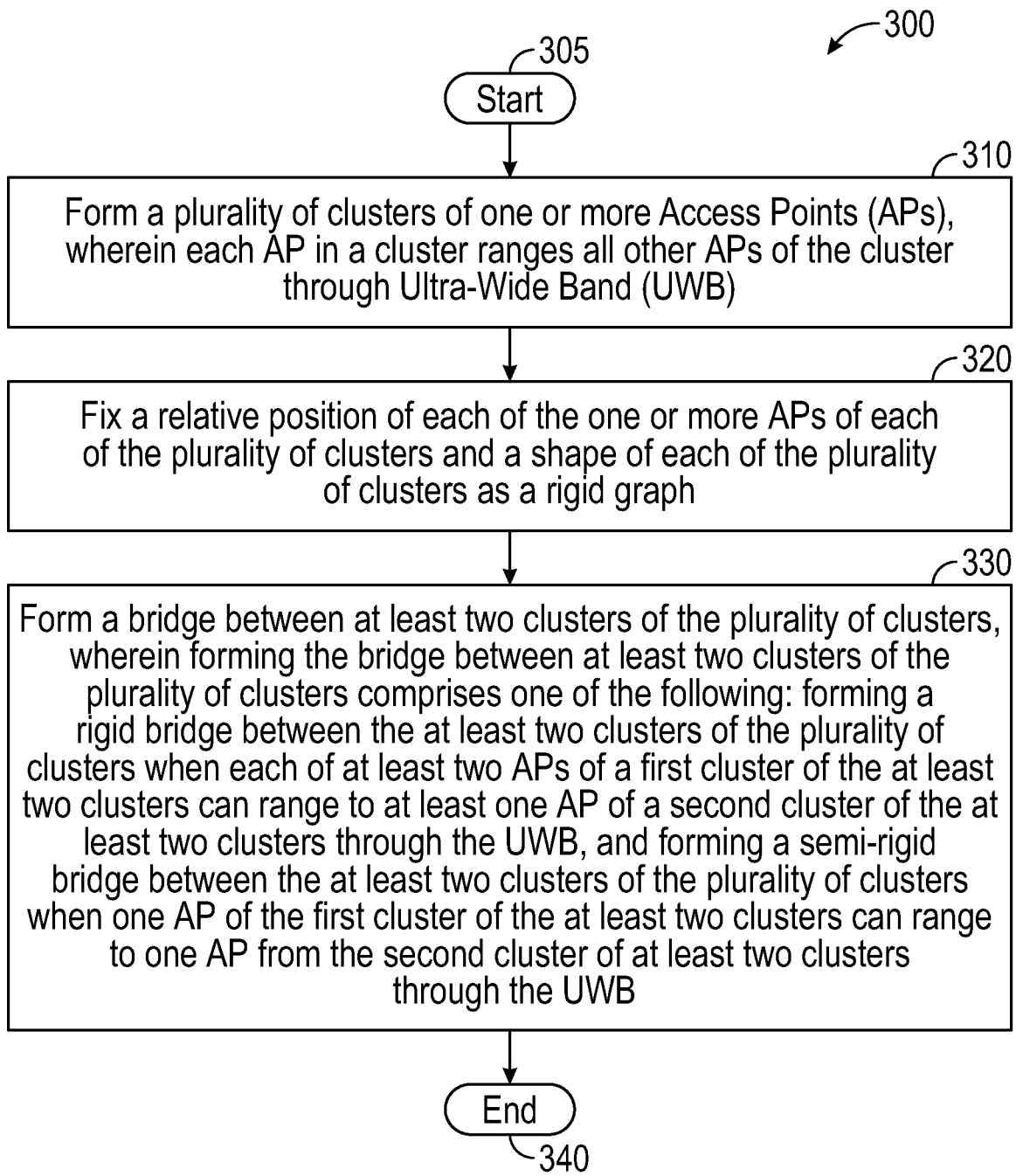
FIG. 3 is a flow chart of a method for providing placement of a plurality of APs on a floorplan.

FIG. 3 is a flow chart setting forth the general stages involved in a method 300 consistent with an embodiment of the disclosure for placement of plurality of APs 106 on floorplan 104. Method 300 may be implemented using controller 102 or any of plurality of APs 106 as described in more detail above with respect to FIG. 1. Ways to implement the stages of method 300 will be described in greater detail below.

Figure 4:
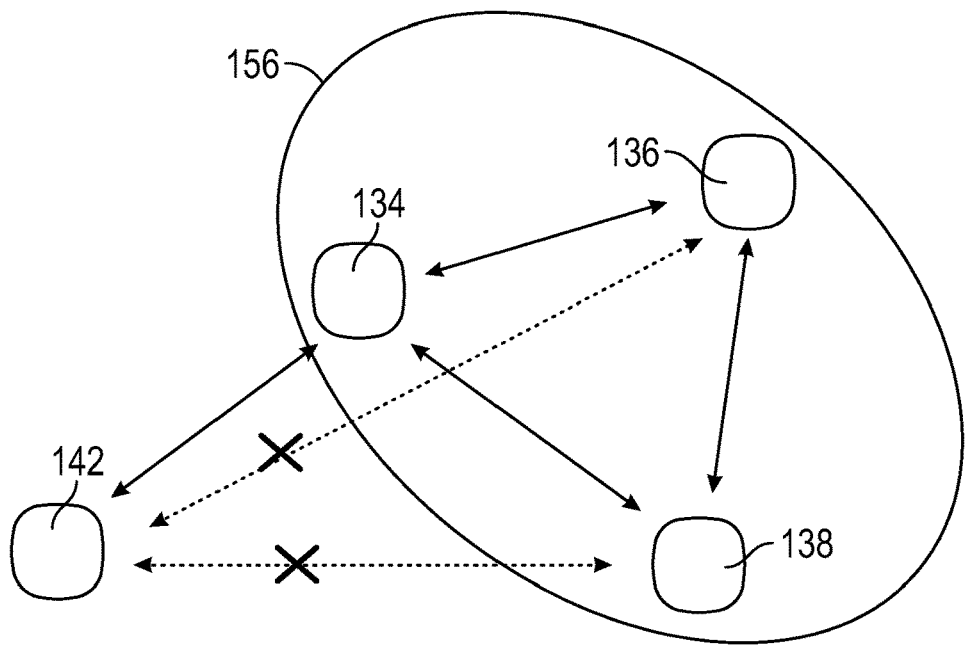
FIG. 4 is a block diagram illustrating forming of a cluster.

Method 300 may begin at starting block 305 and proceed to stage 310 where controller 102 may form a plurality of clusters of one or more APs of plurality of APs 106. Each AP in a cluster may range with all other APs of the cluster through UWB. FIG. 4 is a block diagram illustrating forming of a cluster (e.g., fourth cluster 156). As shown in FIG. 4, each of thirteenth AP 134, fourteenth AP 136, and fifteenth AP 138 may range with each other and may form fourth cluster 156. Seventeenth AP 142 on the other hand may only range with thirteenth AP 134 and may fail to range fourteenth AP 136 and fifteenth AP 138. Hence, seventeenth AP 142 may not be considered as a part of fourth cluster 156 as seventeenth AP 142 may not or fail to range each AP of fourth cluster 156 (i.e., fails to range both fourteenth AP 136 and fifteenth AP 138). At a scale of floorplan 104, the plurality of clusters (for example, first cluster 150, second cluster 152, third cluster 154, and fourth cluster 156) may be formed this way. An AP-to-AP distance between each AP within each cluster may be determined up to 3 centimeters accuracy.

Figure 5:
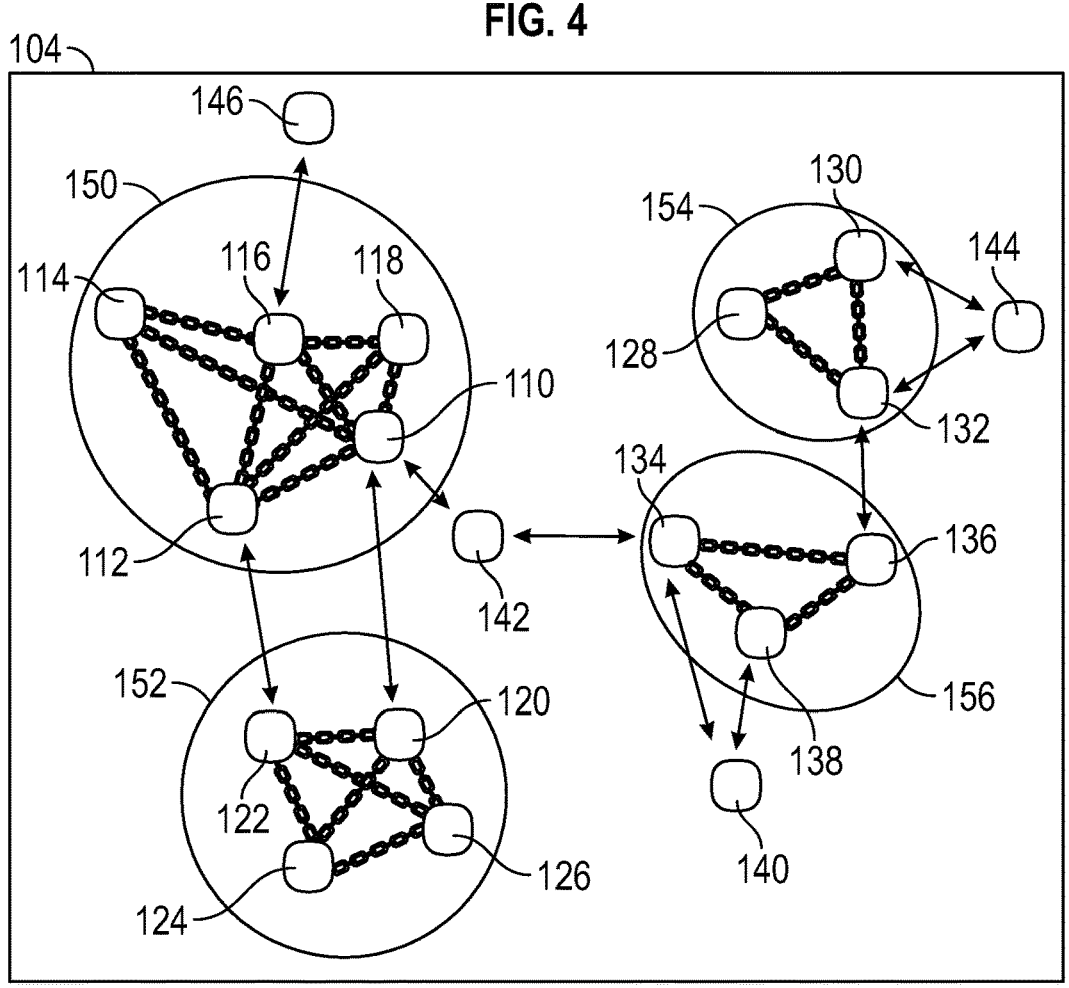
FIG. 5 is a block diagram illustrating distances between APs of each cluster as a rigid graph.

Returning to FIG. 3, from stage 310, where controller 102 may form the plurality of clusters, method 300 may advance to stage 320 where controller 102 may fix a relative position of the one or more APs of each of plurality of clusters and a shape of each of plurality of clusters as a rigid graph. FIG. 5 is a block diagram illustrating distances between APs of each clusters formed as a rigid graph. As shown in FIG. 5, in floorplan 104, the distances between the one or more APs of each cluster may be set to the UWB range value as the rigid graph. In addition, both the shape of the cluster and the relative position of the one or more APs of each cluster may be fixed. Floorplan 104 may now include a series of rigid clusters with some single APs situated between the clusters. For example, and as shown in FIG. 5, floorplan 104 may include first cluster 150, second cluster 152, third cluster 154, and fourth cluster 156. Floorplan 104 may further include single APs, for example, sixteenth AP 140, seventeenth AP 142, eighteenth AP 144, and nineteenth AP 146.

Some APs of a cluster may range to APs of another cluster with UWB but not all APs of a cluster may range to all APs of the other cluster. As shown in FIG. 5, first AP 110 and second AP 112 of first cluster 150 may range with sixth AP 120 and seventh AP 122 of second cluster 152 respectively. In addition, twelfth AP 132 of third cluster 154 may range with fourteenth AP 136 of fourth cluster 156.

Some APs of a cluster may also range to single APs that do not belong to any cluster. In some embodiments, a single AP that may not belong to any cluster may be considered as a cluster of one AP. As shown in FIG. 5, first AP 110 of first cluster 150 may range to seventeenth AP 142 and fourth AP 116 of first cluster 150 may range to nineteenth AP 146. Both seventeenth AP 142 and nineteenth AP 146 are single APs. Seventeenth AP 142 may also range to thirteenth AP 134 which is a member of fourth cluster 156. Both thirteenth AP 134 and fifteenth AP 138 of fourth cluster 156 may range to sixteenth AP 140. In addition, both eleventh AP 130 and twelfth AP 132 of third cluster 154 may range to eighteenth AP 144. Both sixteenth AP 140 and eighteenth AP 144 are single APs.

Figure 6:
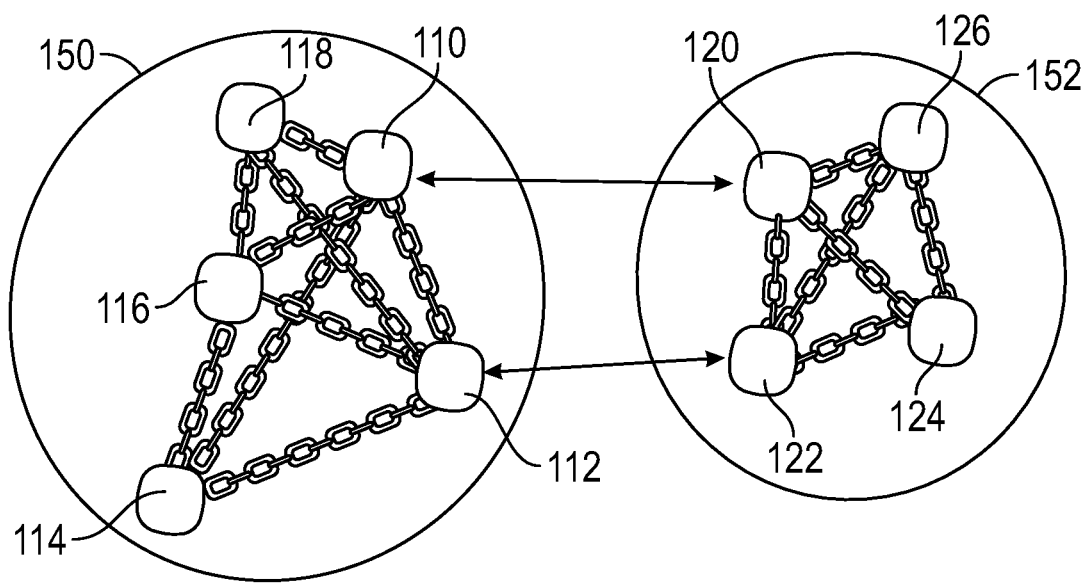
FIG. 6 is a block diagram illustrating a rigid bridge between two clusters.

Returning to FIG. 3, once controller 102 fixes the relative position of the one or more APs of each of plurality of clusters and a shape of each of plurality of clusters as the rigid graph at stage 320, method 300 may advance to stage 330 where controller 102 may form a bridge between at least two clusters of the plurality of clusters. Forming the bridge between at least two clusters of the plurality of clusters may include forming a rigid bridge between the at least two clusters of the plurality of clusters when each of at least two APs from a first cluster of the at least two clusters can range to at least one AP of a second cluster of the at least two clusters through the UWB. FIG. 6 is a block diagram illustrating a rigid bridge between two clusters. As shown in FIG. 6, a rigid bridge may be formed between first cluster 150 and second cluster 152 as first AP 110 and second AP 112 of first cluster 150 may range to sixth AP 120 and seventh AP 122 of second cluster 152 respectively. As the ranges may be accurate, it may effectively constrain the positions and distances between APs of both first cluster 150 and second cluster 152. First cluster 150 and second cluster 152 then may be merged.

Figure 7:
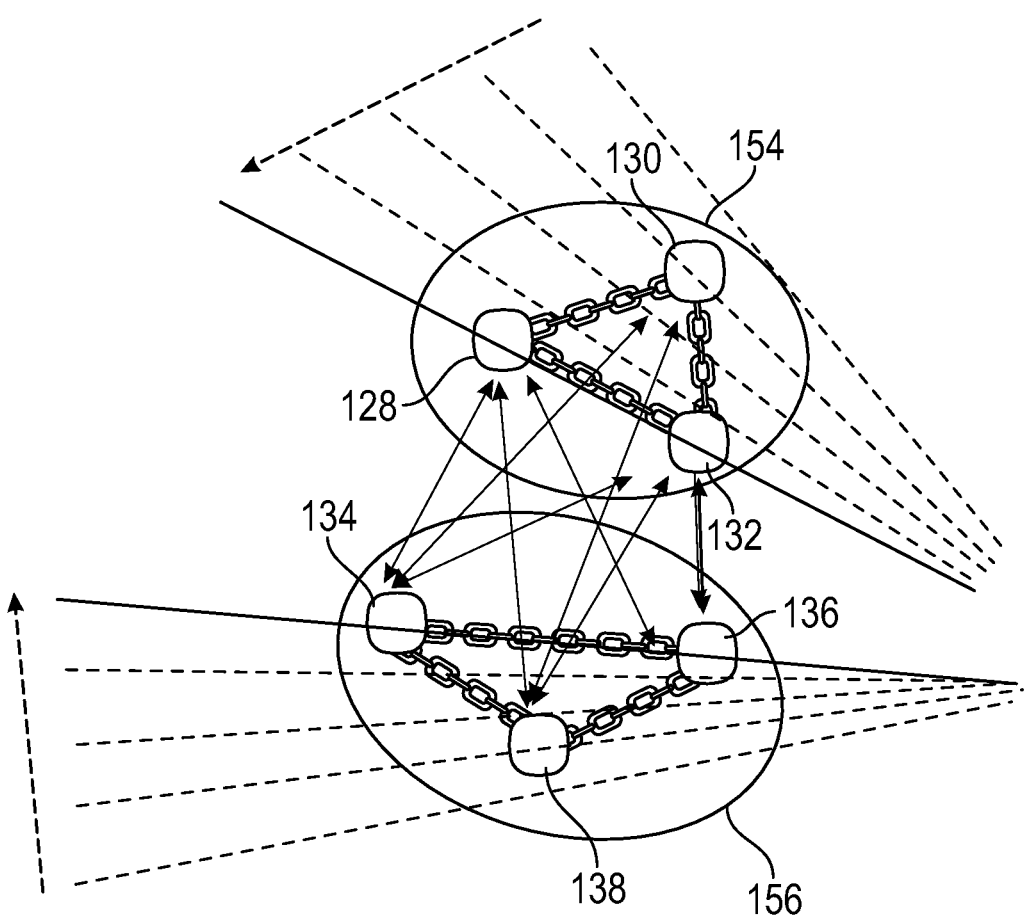
FIG. 7 is a block diagram illustrating a semi-rigid bridge between two clusters.

Forming the bridge between at least two clusters of the plurality of clusters may further include forming a semi-rigid bridge between the at least two clusters of the plurality of clusters when one AP from the first cluster of the at least two clusters can range to the at least one AP from the second cluster of at least two clusters through UWB. FIG. 7 is a block diagram illustrating a semi-rigid bridge between two clusters. As shown in FIG. 7, a semi-rigid bridge may be formed between third cluster 154 and fourth cluster 156 as twelfth AP 132 of third cluster 154 may range to fourteenth AP 136 of fourth cluster 156. In this scenario, the distance between two APs in two separate clusters (i.e., twelfth AP 132 of third cluster 154 may range to fourteenth AP 136 of fourth cluster 156) may be known, but a respective orientation of two clusters may not be known.

APs on both sides of the semi-rigid link may use a second ranging process (e.g., Fine Time Measurement (FTM) or WiFi) to range to one another. FTM may not be as accurate as UWB, and, thus, the range determined using FTM may be elastic, stretched by up to 35% in the worst cases. For example, twelfth AP 132 measuring a range of 25 m to fourteenth AP 136 using FTM may lead controller 102 to conclude that the range is 25 meters or less, likely not less than 17 meters. Each AP individually then may be marked on a disk (or a washer) representing its possible distance to APs in the other cluster. However, each AP may also be tied by a rigid chain to the other APs in its own cluster, which may also generate elastic ranges to the other APs in the other clusters. An optimization method (e.g., using Lagrange multipliers and support vectors) may be used to optimize the distances between the APs on both side of the semi-rigid bridge and reduce the washer. The optimization method may reduce the elastic distance uncertainty to its UWB equivalent.

The same process may be repeated with APs that may not belong to any cluster (i.e., sixteenth AP 140, seventeenth AP 142, eighteenth AP 144, and nineteenth AP 146). These APs may be at an edge or behind obstacles (e.g., a pillar) and thus may fail to range through UWB with APs of another cluster. While these single-AP clusters may be able to accurately range using UWB to one or more but not all APs in an adjacent cluster. In this case, the single AP may range to the APs that are visible on the edge of adjacent clusters, forming a stub. As long as a single-AP cluster may range to at least two APs of a cluster with multiple APs using UWB, the range of the single-AP may be determined. In addition, the single-AP clusters may still be able to range with other APs using Wi-Fi.

After formation of the bridges, floorplan 104 may comprise plurality of APs 106 connected by a rigid graph, including between APs that may not perform ranging using UWB between them, indicating a position of each of plurality of APs 106 on floorplan 104. In another embodiment, ranging using FTM and UWB may be merged, and their respective graphs may be compared. A graph with highest rigidity may be chosen. Once controller 102 forms the bridge between at least two clusters of the plurality of clusters in stage 330, method 300 may then end at stage 340.

Figure 8:
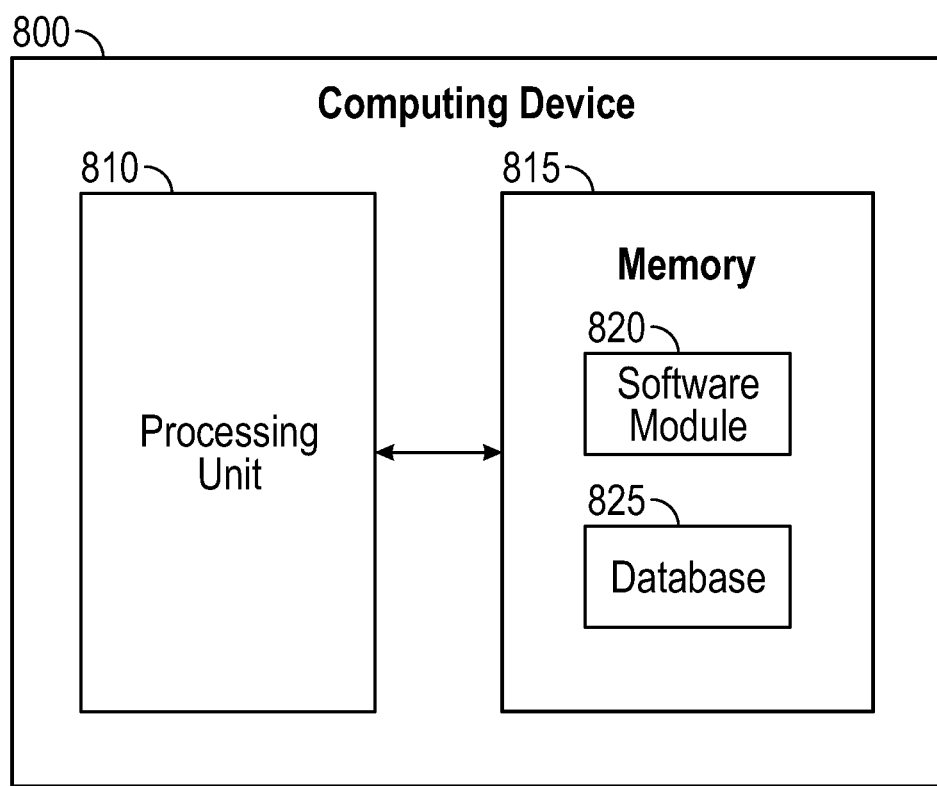
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for determining a range between two APs with respect to FIG. 2 and processes for placement of plurality of APs 106 on floorplan 104 as described above with respect to FIG. 3. Computing device 800, for example, may provide an operating environment for controller 102 and plurality of APs 106 (i.e., first AP 110, second AP 112, third AP 114, fourth AP 116, fifth AP 118, sixth AP 120, seventh AP 122, eighth AP 124, ninth AP 126, tenth AP 128, eleventh AP 130, twelfth AP 132, thirteenth AP 134, fourteenth AP 136, fifteenth AP 138, sixteenth AP 140, seventeenth AP 142, eighteenth AP 144, and nineteenth AP 146). Controller 102 and plurality of APs 106 (i.e., first AP 110, second AP 112, third AP 114, fourth AP 116, fifth AP 118, sixth AP 120, seventh AP 122, eighth AP 124, ninth AP 126, tenth AP 128, eleventh AP 130, twelfth AP 132, thirteenth AP 134, fourteenth AP 136, fifteenth AP 138, sixteenth AP 140, seventeenth AP 142, eighteenth AP 144, and nineteenth AP 146) may operate in other environments and are not limited to computing device 800.

Computing device 800 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples, and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
ranging, by a host Access Point (AP), each neighbor AP of the host AP;
categorizing one or more neighbor APs that failed to range with the host AP in a failed neighbor AP list;
re-ranging, by the host AP, each of the one or more neighbor APs in the failed neighbor AP list with a modified ranging parameter; and
categorizing at least one neighbor AP of the one or more neighbor APs in the failed neighbor AP list that succeeded in re-ranging with the host AP in an extended range neighbor AP list.

2. The method of claim 1, wherein ranging each neighbor AP of the host AP comprises way ranging each neighbor AP of the host AP using an Ultra-Wide Band (UWB) radio.

3. The method of claim 1, wherein re-ranging each of the one or more neighbor APs in the failed neighbor AP list with the modified ranging parameter comprises re-ranging each of the one or more neighbor APs in the failed neighbor AP list with shortened Scrambled Timestamp Sequence (STS) of an Ultra-Wide Band (UWB) frame on a UWB radio.

4. The method of claim 1, wherein re-ranging each of the one or more neighbor APs in the failed neighbor AP list with the modified ranging parameter comprises re-ranging each of the one or more neighbor APs in the failed neighbor AP list with removed Scrambled Timestamp Sequence (STS) from an Ultra-Wide Band (UWB) frame on a UWB radio.

5. The method of claim 1, wherein re-ranging each of the one or more neighbor APs in the failed neighbor AP list with the modified ranging parameter comprises scheduling re-ranging of each of the one or more neighbor APs in the failed neighbor AP list in a time slot that avoids collision.

6. The method of claim 1, wherein re-ranging each of the one or more neighbor APs in the failed neighbor AP list with the modified ranging parameter comprises re-ranging each of the one or more neighbor APs in the failed neighbor AP list with a shortened Synchronization Sequence of an Ultra-Wide Band (UWB) frame on a UWB radio.

7. The method of claim 1, wherein re-ranging each of the one or more neighbor APs in the failed neighbor AP list with the modified ranging parameter comprises re-ranging each of the one or more neighbor APs in the failed neighbor AP list with one of the following: a shortened Synchronization Sequence of an Ultra-Wide Band (UWB) frame on a UWB radio, removed Scrambled Timestamp Sequence (STS) from the UWB frame on the UWB radio, shortened STS of the UWB frame on the UWB radio, or a combination thereof.

8. A system comprising:
a memory storage; and
a processing unit coupled to the memory storage, wherein the processing unit is operative to:
range each neighbor AP of a host Access Point (AP);
categorize one or more neighbor APs that failed to range with the host AP in a failed neighbor AP list;
re-range each of the one or more neighbor APs in the failed neighbor AP list with a modified ranging parameter; and
categorize at least one neighbor AP of the one or more neighbor APs in the failed neighbor AP list that succeeded in re-ranging with the host AP in an extended range neighbor AP list.

9. The system of claim 8, wherein the processing unit being operative to range each neighbor AP of the host AP comprises the processing unit being operative to way range each neighbor AP of the host AP using an Ultra-Wide Band (UWB) radio.

10. The system of claim 8, wherein the processing unit being operative to re-range each of the one or more neighbor APs in the failed neighbor AP list with the modified ranging parameter comprises the processing unit being operative to re-range each of the one or more neighbor APs in the failed neighbor AP list with reduced Scrambled Timestamp Sequence (STS) of an Ultra-Wide Band (UWB) frame on a UWB radio.

11. The system of claim 8, wherein the processing unit being operative to re-range each of the one or more neighbor APs in the failed neighbor AP list with the modified ranging parameter comprises the processing unit being operative to re-range each of the one or more neighbor APs in the failed neighbor AP list with removed Scrambled Timestamp Sequence (STS) from an Ultra-Wide Band (UWB) frame on a UWB radio.

12. The system of claim 8, wherein the processing unit being operative to re-range each of the one or more neighbor APs in the failed neighbor AP list with the modified ranging parameter comprises the processing unit being operative to schedule re-ranging of each of the one or more neighbor APs in the failed neighbor AP list in a time slot that avoids collision.

13. The system of claim 8, wherein the processing unit being operative to re-range each of the one or more neighbor APs in the failed neighbor AP list with the modified ranging parameter comprises the processing unit being operative to re-range each of the one or more neighbor APs in the failed neighbor AP list with one of the following: a shortened Synchronization Sequence of an Ultra-Wide Band (UWB)

frame on a UWB radio, removed Scrambled Timestamp Sequence (STS) from the UWB frame on the UWB radio, shortened STS of the UWB frame on the UWB radio, or a combination thereof.

* * * * *